Aug. 26, 1969

M. E. BEYERS ET AL

3,463,190

HYDRAULIC BLADE CONTROL

Original Filed Aug. 4, 1964

INVENTORS
MARVIN E. BEYERS  JOHN A. JUNCK
MACKENZIE P. BROWN  JERRE F. LAUTERBACH
JOHN W. CARTER  FRANK H. WINTERS

BY

ATTORNEYS

Aug. 26, 1969       M. E. BEYERS ET AL       3,463,190
                    HYDRAULIC BLADE CONTROL
                                              5 Sheets-Sheet 2
Original Filed Aug. 4, 1964

INVENTORS
MARVIN E. BEYERS    JOHN A. JUNCK
MACKENZIE P. BROWN  JERRE F. LAUTERBACH
JOHN W. CARTER      FRANK H. WINTERS
BY
ATTORNEYS

Inventors MARVIN E. BEYERS  JOHN A. JUNCK
MACKENZIE P. BROWN  JERRE F. LAUTERBACH
JOHN W. CARTER  FRANK H. WINTERS Aug. 26, 1969   M. E. BEYERS ET AL   3,463,190
HYDRAULIC BLADE CONTROL
Original Filed Aug. 4, 1964   5 Sheets-Sheet 5

Fig.6.

INVENTORS
MARVIN E. BEYERS   JOHN A. JUNCK
MACKENZIE P. BROWN   JERRE F. LAUTERBACH
JOHN W. CARTER   FRANK H. WINTERS
BY

ATTORNEYS 3,463,190
HYDRAULIC BLADE CONTROL
Marvin E. Beyers, Peoria, Mackenzie P. Brown, New Lenox, John W. Carter, Peoria, and John A. Junck, Joliet, Ill., Jerre F. Lauterbach, Glastonbury, Conn., and Frank H. Winters, Joliet, Ill., assignors to Caterpillar Tractor Co., Peoria, Ill., a corporation of California
Original application Aug. 4, 1964, Ser. No. 387,307, now Patent No. 3,354,563, dated Nov. 28, 1967. Divided and this application June 12, 1967, Ser. No. 667,015
Int. Cl. E03b; E03c; F17d
U.S. Cl. 137—625.17                   1 Claim

ABSTRACT OF THE DISCLOSURE

An automatic blade control unit for adjusting slope of a grader blade including a blade slope simulator and a valve responsive to deviations of the simulator from a desired slope to direct working fluid to a hydraulic system suitable for positioning the blade at a desired slope, the valve being adjustable to vary the desired blade slope.

---

This is a divisional application of application Ser. No. 387,307 filed Aug. 4, 1964, now Patent No. 3,354,563.

The present invention relates to automatic blade controls and more particularly to controls for assisting in maintaining a desired cutting slope of a motor grader blade.

Those familiar with the activities of the earth moving industry in general, and road grading in particular are keenly aware of the high performance and accuracy demanded of the present day motor grader. Accuracies of one-eighth of an inch in ten feet are not uncommon to work performed by motor graders. In order to obtain accuracies of this nature it is necessary for a motor grader operator to make several passes over the same terrain, and each pass must be made at a speed slow enough to enable the operator to compensate for ground irregularities and maintain the motor grader blade at the desired slope. Since the amount of finished grading which can be done by a motor grader in a given period of time is a factor which contributes significantly to the cost of performing a grading contract, the industry has long searched for an addition to the conventional motor grader which can aid the motor grader operator to maintain a desired blade slope.

While several attempts have been made to provide a motor grader with automatic or semi-automatic blade controls, none of these attempts have resulted in blade control systems which have met with significant commercial acceptance. In order for a motor grader blade control system to fulfill the needs of the industry it is necessary that such a system be capable of providing accurate and dependable service in the field and under the rugged conditions which exist in the field. One of the deficiencies in motor blade control systems known in the art is the vulnerability of such systems to damage during actual motor grader operating conditions. Other drawbacks of known blade control systems include exceedingly high cost and frequent system failure from causes other than external damage. When a motor grader blade control system does not provide accurate, dependable service over reasonably long periods of time, it does not increase the operating efficiency of a motor grader and consequently fails to perform the function for which it was developed.

A problem which has provided a great deal of difficulty in this field is the simulation of the slope of the motor grader blade. At the heart of every motor grader blade control system is a blade slope simulator which induces a signal when the slope of the blade deviates from a preselected blade slope. The problem occurs in constantly changing the disposition of the blade slope simulator to accurately reflect the changing disposition of the blade itself. The slope of the actual working blade is a function of the blade incline (measured by the deviation of the blade support circle from a horizontal plane measured along the longitudinal axis), of blade angle (measured by the angular deviation of the blade from a plane transverse to the longitudinal axis of the motor grader, as well as of the slope of the blade support circle (measured by the angle of the blade support circle from a horizontal plane where the angle is taken along a transverse axis). A change in any of the variables set out above can result in a change in the blade slope which must be reflected in the blade slope simulator if completely accurate correspondence between the simulator and the blade is to be maintained.

A blade slope simulator of unique design giving rise to many advantageous features is set forth in detail in assignee's copending application Ser. No. 351,020 of William W. Breitbarth et al., filed Mar. 11, 1964, now Patent No. 3,221,960. This copending patent application teaches a blade slope simulator advantageously disposed within the drawbar ball which forms an articulate connection between the drawbar and bolster of the motor grader. Being mounted within the drawbar ball the simulator automatically reflects changes in the blade incline and changes in the slope of the blade support circle.

The present invention is directed to a hydraulic control system for use in conjunction with a blade slope simulator disposed in the drawbar ball of a motor grader. The hydraulic system is operative to sense a deviation between a desired blade slope and the actual blade slope and respond to this sensed deviation to change the slope of the blade until the blade is once again disposed at the desired slope.

The control system of the present invention like the blade slope simulator is carefully designed to enable it to be disposed so as to be completely protected from potentially damaging forces which are present during normal operation. The system further provides a novel arrangement of components which includes several novel components, all of which combine to provide a highly advantageous, dependable control system.

The control system taught by the present invention has an advantageous use separate from the ball resolver mechanism mentioned above. More particularly, a blade slope indicator located directly on the blade itself can be advantageously employed with the control system of the present invention to provide a rather economical and dependable automatic blade slope mechanism.

Accordingly, it is an object of the present invention to provide a control system for automatically maintaining a desired blade slope of an earth moving vehicle.

It is another object of the present invention to provide a hydraulic control system for use in conjunction with a blade slope simulator disposed within the drawbar ball of a motor grader.

A further object of the present invention is to provide a system for maintaining a desired slope of a motor grader blade wherein the blade slope simulator is disposed on the blade itself.

Still another object of the present invention is to provide a valve means which responds to deviations of a controlled blade from a desired slope to direct working fluid to a hydraulic system disposed to alter the slope of the blade.

Further and more specific objects and advantages of the invention are made apparent in the following specification wherein a preferred form of the invention is described by reference to the accompanying drawings.

Figure 1:
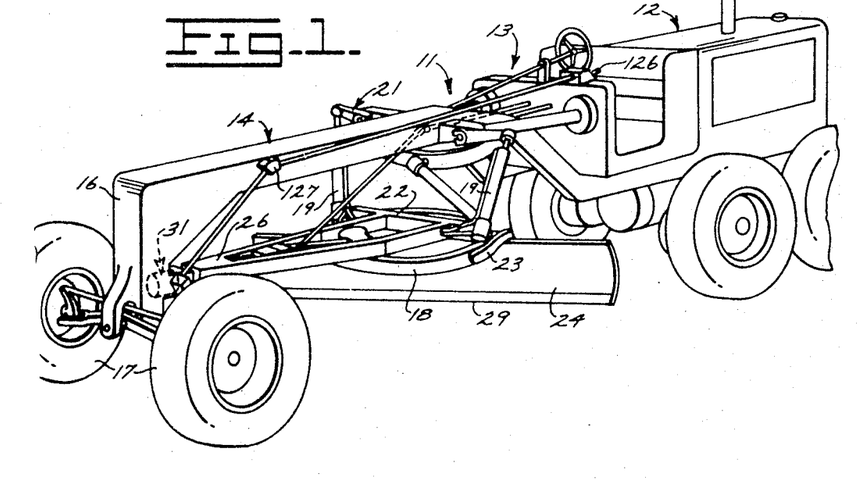
FIG. 1 is an isometric illustration of a motor grader equipped with the automatic blade control system of the present invention.

Referring now to FIG. 1, a motor grader 11 includes a rear engine portion 12, an operator's control station 13, a main frame 14 extending forwardly from the operator's station, and a bolster 16 integral with the main frame 14 and supported between the front wheels 17. Disposed below the main frame 14 between the bolster 16 and the operator's station 13 is a blade support circle 18 which is secured to the main frame 14 by a pair of lift jacks 19, each of which is connected at one end to a bracket 21 connecting to the main frame 14 and at the opposite end to a crossbar 22 which is rigidly secured to the blade support circle 18 at an orientation which is generally transverse to the main frame 14. Blade support structure 23 associated with the blade support circle 18 serves to mount the motor grader blade 24 to the blade support circle 18.

A drawbar 26 is disposed between the blade support circle 18 and the bolster 16. The drawbar is rigidly connected to the blade support circle 18 at one of its ends and connected at its other end to the bolster 16 by an articulate connection formed by a ball 27 integral with the drawbar 26, and a socket 28 integral with the bolster 16 (see FIG. 2).

The slope of the blade 24 is defined as the angle which the cutting edge 29 of the blade makes with a horizontal plane. The blade support structure formed by member 23, circle 18 and drawbar 26 has three degrees of freedom; changes in any or all of which can affect the slope of the blade 24. If hydraulic jacks 19 are operated so as to cause a relative displacement between the vertical positions of their lower ends (those ends which connect to the crossbar 22) the slope of the blade circle 18 (measured by the angular deviation of the blade circle 18 from a horizontal plane as measured along the line transverse to the longitudinal axis of the motor grader 11) will be altered. The incline of the circle 18 (measured by the angular deviation of the circle 18 from a horizontal plane, as measured along the line parallel to the longitudinal axis of the motor grader 11) can also be changed by raising or lowering jacks 19. The final degree of freedom which the blade support structure has is supplied by a connection between support member 23 and circle 18 which enables the blade 24 to have its angle changed (wherein the angle is measured by the angular deviation between the blade 26 and a plane transverse to the longitudinal axis of the motor grader 11). The present invention provides a control system for sensing and correcting changes in blade slope due to changes in the slope of the blade circle or the incline of the blade circle, and responding to these changes by inducing actuation of one of the jacks 19 to re-establish the proper slope of the blade 24. Means for sensing changes in blade slope due to changes in blade angle are fully described in assignee's copending application of William W. Breitbarth et al. Ser. No. 351,020, filed Mar. 11, 1964.

The relatively sensitive portions of the control system of the present invention, which will be described in detail below, are located in an area generally indicated at 31 which is seen to be well within the bolster 16 and thereby protected from rocks or other debris which are encountered during operation of a motor grader.

The overall operation of the embodiment of the present invention which operates in conjunction with the blade slope simulator disposed within the drawbar ball is best illustrated with reference to FIGS. 4 and 6. A pump 32 provides hydraulic pressure fluid through a conduit 33 to a plurality of pressure control valves 34 which in turn provide three separate sources of fluid pressure in conduits 36, 37 and 38. The pressure control valves 34 are so arranged that the pressure of the fluid in conduits 36 and 38 is equal under normal conditions. Each of the three conduits from pressure control valve 34 enters a valve housing 39 containing a spring centered valve spool 41 slidably disposed in a valve bore 42. A spring 43 is disposed between each end of valve spool 41 and the ends of the bore 42 whereby the valve spool 41 is centered within the valve bore 42 in the absence of other forces.

A passageway 44 through valve housing 39 provides communication between conduit 36 and a conduit 46 leading to the blade slope simulator controlled valve 47. The passageway 44 includes a restriction 48, and a port 49 which connects with passageway 44 providing communication between passageway 44 and one end of bore 42 whereby the pressure in conduit 46 is applied against one end of valve spool 41.

In a similar fashion conduits 38 communicate with a passageway 51 which leads through the valve housing 39 to a conduit 52 which in turn leads to the blade simulator controlled valve 47. The passageway 51 includes a restriction 53 and communicates with a port 54 leading to the other end of valve spool 41 whereby the fluid pressure in conduit 52 is applied against valve spool 41 whereby a force is provided to counteract the force of the fluid pressure acting against the other end of the valve spool.

Conduit 37 communicates with valve bore 42 at two separate axial locations; one via valve housing passageway 56 and one via port 57. When the forces on either end of valve spool 41 are equal and the valve spool is centered within the bore 42, passageway 56 is blocked from communicating with bore 42 by valve spool land 58. Under these conditions the port 57 communicates with bore 42 and enables fluid in conduit 37 to flow to provide a means for angular orientation of T bar 86 to correspond to the angular orientation of the blade. The pulley wheel 96 is associated with a spring member urging it in one direction and a band 97 which is controlled to change the position of the pulley wheel when the position of the angular blade is changed. The precise mechanism associated with the pulley wheel 96 and band 97 are not shown or described as they do not form a portion of the present invention. Assignee's copending application of William W. Breitbarth et al., Ser. No. 351,020, filed Mar. 11, 1964, describes in detail a unique system for maintaining angular correlation between T bar 86 and the blade. It should be noted that an understanding of the angular correlation means is not necessary to a complete understanding of the invention presented herein.

From the foregoing description it can be seen that the blade slope simulator comprised of support member 89 and T bar 86 is affected whenever the position of the blade changes, and responds to changes in blade slope by changing the position of quadrant 93 and accordingly rotating the shaft 94. Thus, the rotation of shaft 94 serves as a means for sensing a change in blade slope and, as will be shown by the description which follows, serves to operate the blade simulator controlled valve which induces a source of hydraulic fluid pressure to be applied to one of the blade lift jacks 19 as fully described above in connection with FIGS. 4 and 6.

Figure 2:
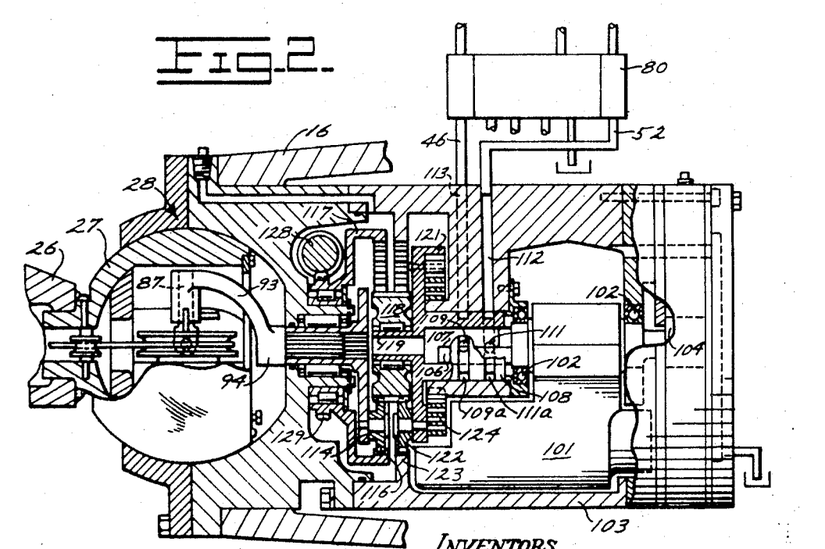
FIG. 2 is a sectional side view of a blade slope simulator controlled valve shown in conjunction with a blade slope simulator wherein certain portions are broken away to more clearly reveal the details of the invention.
Figures 2A, 4:
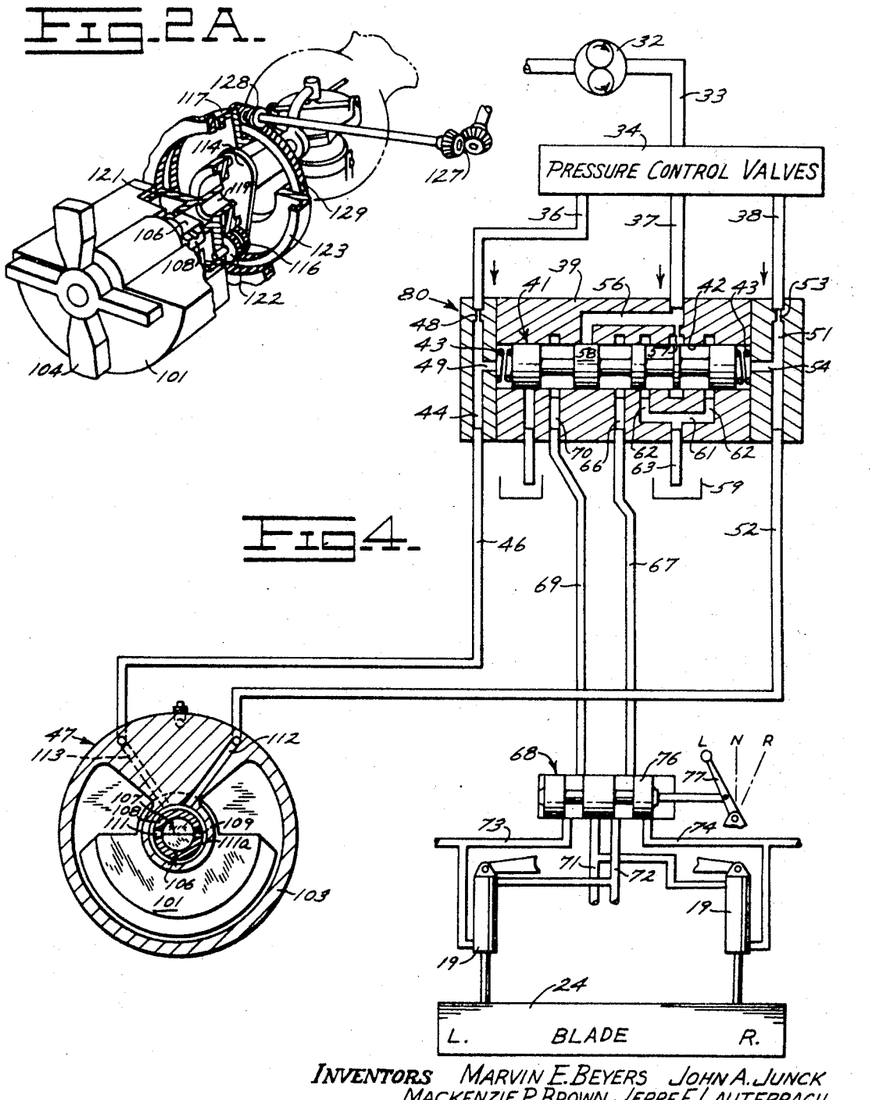
FIG. 2a is an isometric illustration of the valve shown in FIG. 2.
FIG. 4 is a semi-schematic illustration of the overall hydraulic system of the present invention.

Referring now to FIGS. 2, 2a and 4, a pendulum 101 is rotatably mounted on bearings 102 and serves as a vertical reference source. The pendulum is disposed within a housing 103 which may be provided with a quantity of viscous material to cooperate with a damper 104 associated with the pendulum for purposes of insuring smooth operation. Integrally connected to pendulum 101 is a flat shaft 106 which has a flat surface 107 which is maintained horizontal by the pendulum 101.

The flat shaft 106 is rotatably disposed within a cylindrical sleeve 108 which has a pair of diametrically opposed ports 109 and 111 extending therethrough. Ports 109 and 111 are disposed at different axial locations on the sleeve 108 and are associated with grooves 109a and 111a, respectively, which circumscribe the sleeve at the axial location of the respective port. Groove 111a registers with a passageway 112 in housing 103 while groove 109a registers with a passageway 113, also in housing 103. Passageway 112 communicates with conduit 52 while passageway 113 communicates with conduit 46. As explained above, conduits 46 and 52 are continuously supplied with pressure fluid which is directed to the simulator controlled valve 47. The fluid in conduit 46 passes through passageway 113 and groove 109a to port 109 through which it passes to the interior of sleeve 108 leading to a low pressure area within housing 103. In a similar manner the pressure fluid in conduit 52 enters passageway 112 and groove 111a from which it enters the interior of sleeve 108 through port 111. The ease with which fluid can pass through the two paths set out above is dependent upon the relative orientation of sleeve 108 and the flat shaft 106. Whenever a line drawn through ports 109 and 111 is at an angle with the horizontal, as defined by surface 107, the pressure in conduits 46 and 52 will differ and pressure fluid will be supplied to one of jacks 19 to cause a correction of the blade slope. The mechanism which connects quadrant 93 and shaft 94 to the sleeve 108 provides the means for selecting an initial blade slope and for establishing the proper relative position between flat shaft 106 and sleeve 108 to re-establish equal pressures in conduits 46 and 52 when the blade slope has been corrected.

Shaft 94 is splined to a planet gear carrier 114 which carries a planet gear 116. Planet gear 116 engages a rotatable ring gear 117 and a sun gear 118 which is rotatably mounted on a shaft 119 which is an integral extension of sleeve 108. A planet carrier 121 formed by a flange integral with sleeve 108 carries a planet gear 122 which engages the sun gear 118 and a stationary ring gear 123. A spring 124 is connected between flange 121 and housing 103 to pre-load the sleeve 108 for the purpose of avoiding backlash problems.

In order to manually adjust the position of sleeve 108 the operator turns hand crank 126 (see FIG. 1) which operates through appropriate bevel gears generally indicated at 127 to drive a worm gear 128 which engages a ring gear 129 integral with rotatable ring gear 117. The induced rotation of ring gear 129 causes rotation of ring gear 117 which drives planet gear 116 which in turn drives planet gear 122 through the common sun gear 118. Planet gear 122 reacts against stationary ring gear 123 to drive the carrier 121 and thus rotate the sleeve 108 to the desired position. The gear mechanism described allows a 70 to 1 ratio by which the operator can accurately rotate the sleeve 108 to the precise position desired.

In order to operate the automatic blade control mechanism of the present invention a motor grader operator turns the crank 126 until an indicator mechanism (not shown) indicates the desired blade slope. The turning of crank 126 operates to rotate the sleeve 108 in the manner described in detail above and thus cause an imbalance in the pressure between the conduits 46 and 52 (unless the blade happens to be at the desired slope). The difference in pressure in conduits 46 and 52 results in valve spool 41 shifting from its center position to an off-center position resulting in pressure fluid being directed to one of jacks 19 for the purpose of raising or lowering one end of the blade 24. As one end of the blade 24 is raised or lowered, the drawbar 26 is rotated causing rotation of ball 27 which causes the vertical position of member 87 to change with an accompanying rotation of shaft 94. Rotation of shaft 94 causes rotation of planet gear 116 which is connected to shaft 94 through carrier 114. The planet gear 116 drives the sun gear 118 which in turn drives the planet 122 carried by flange 121 associated with sleeve 108. Thus, the drawbar 26 rotates until the sleeve 108 has been positioned such that a line drawn between the ports 109 and 111 is horizontal, at which position the ports 109 and 111 offer the same resistance to fluid flow thus re-establishing an equal fluid pressure in conduits 46 and 52. When the pressure in conduits 46 and 52 is equalized the spool 41 returns to its center position and pressure fluid is no longer made available to jack 19.

Once the desired blade slope has been selected it is automatically maintained without further settings by the operator. If during the operation of the motor grader terrain is encountered which causes the blade to change its slope, the pendulum 101 will rotate causing the flat shaft 106 to rotate whereby unequal pressures will be established in conduits 46 and 52 resulting in fluid pressure to one of jacks 19. Once again the rotation of drawbar 26 as a result of the raising or lowering of one end of blade 24 acts on the quadrant 93 which in turn acts through the gear reduction mechanism on the sleeve 108 to return it to that position at which the flow of fluid through conduits 109 and 111 is similarly restricted whereby equal fluid pressures are established in conduits 46 and 52.

Figures 3, 3A:
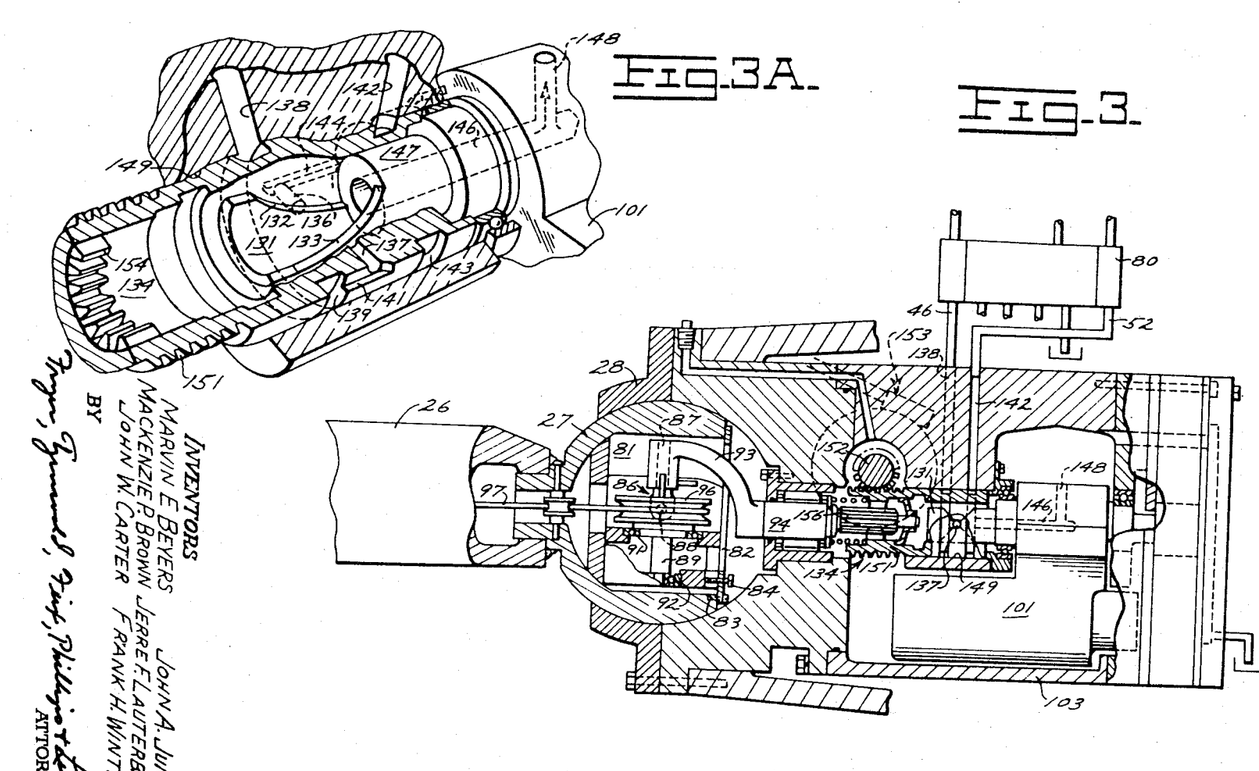
FIG. 3 is a sectional side view of an alternate embodiment of a blade slope simulator controlled valve in conjunction with a blade slope simulator wherein certain portions are broken away.
FIG. 3a is an isometric illustration of the valve of FIG. 3.

An alternate embodiment of a blade simulator controlled valve is illustrated in FIGS. 3 and 3a. A hollow tubular section 131 is secured to pendulum 101 for rotation therewith. The tubular section 131 is machined to provide two opposing helical surfaces 132 and 133. The tubular section 131 is disposed within a cylindrical sleeve 134 which has a pair of diametrically opposed ports 136 and 137 extending through it in the vicinity of the tubular section 131. A position of the tubular section 131 relative to sleeve 134 exists such that the ports 136 and 137 are similarly intersected by the helical surfaces 132 and 133, respectively. In this position the same resistance to fluid flow through the ports is established.

through the bore 42 to a low pressure sump 59 via passageways 61 and 62, and conduit 63. As will be explained in detail below, the blade simulator controlled valve 47 enables the fluid in conduits 46 and 52 to pass freely to a low pressure sump as long as the blade is disposed at the desired slope.

Thus, in operation with the blade at the desired slope, the pump 32 supplies pressure to conduits 36, 37 and 38. Conduits 36 and 38 provide pressure fluid which acts on the ends of valve spool 41 and maintains them centered. The restrictions 48 and 53 enable the hydraulic centering to be accomplished at a desired pressure with a minimum amount of the fluid provided by the pump 32. The remainder of the fluid is directed to conduit 37 which acts as a source of fluid pressure for energizing one of jacks 19 when it is necessary to make a blade slope correction.

When the blade slope is not that which was preselected, the valve 47 will automatically cause the relative pressures in conduits 46 and 52 to change (in a manner to be described in detail below). A change in the pressures in conduits 46 and 52 from a condition of equality results in an imbalance in forces acting on spool 41. This results in the valve spool 41 shifting from its center position to an off-center position such as that shown in FIG. 6.

Figure 6:
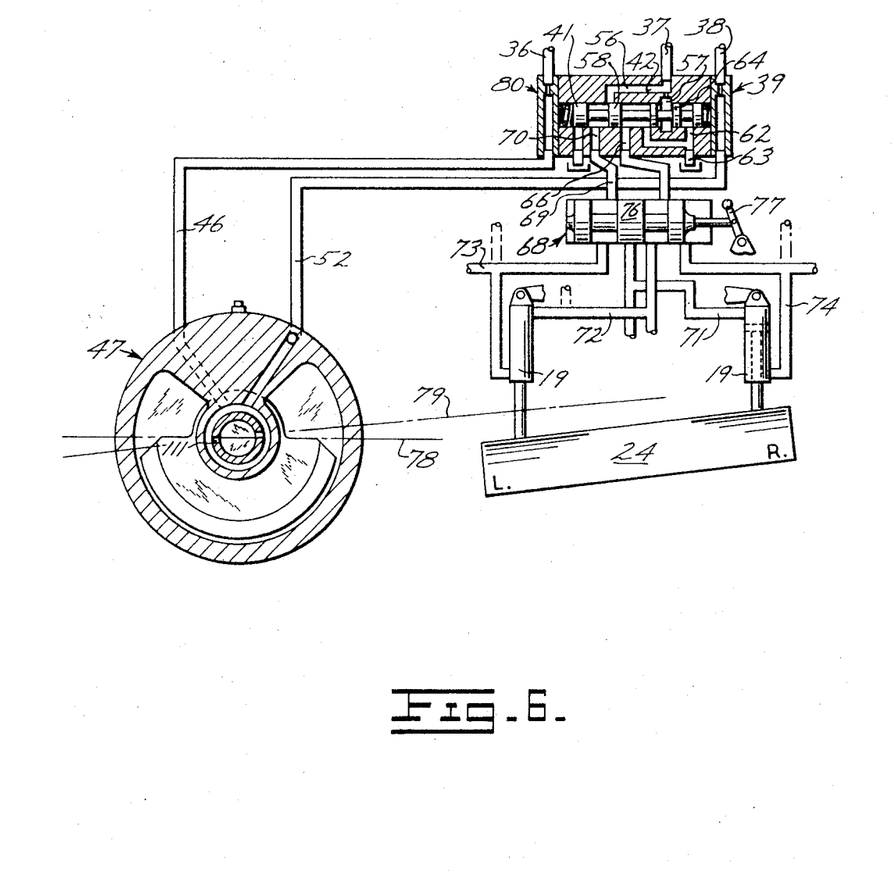
FIG. 6 is a semi-schematic illustration similar to FIG. 4 wherein the components are shown in the positions which they assume when the slope of the blade and the blade slope simulator are not correlated.

FIG. 6 illustrates the components of the valve comprised of housing 39 and spool 41 when a relative rise in pressure occurs in the circuit of the conduit 52. The valve spool 41 moves leftwardly removing the land 58 as an obstruction to the communication between passageway 56 and bore 42. The leftward movement of valve spool 41 also results in the port 57 being isolated from either of passageways 62 by means of a spool land 64. Thus, the conduit 37 is blocked from the low pressure sump 63 and is made available to the bore 42 by way of passageway 56. The leftward movement of valve spool 41 also operates to place a passageway 66 and connecting conduit 67 in communication with the passageway 56 via bore 42. Thus, the overall effect of the pressure imbalance caused by the rise in pressure in conduit 52 is the removal of conduit 37 from communication with sump 63 and placement of the conduit 37 in communication with conduit 67 which connects to selector valve 68.

The selector valve 68 also communicates with the bore 42 through a conduit 69 and a passageway 70. These fluid channels receive the fluid from conduit 37, rather than passageway 66 and conduit 67, when a pressure imbalance causes a rightward rather than a leftward movement of valve spool 41. The head ends of jacks 19 communicate with selector valve 68 by way of conduits 72 and 74 while the rod ends of the jacks communicate with the selector valve 68 through conduits 71 and 73. The selector valve 68 is operative to communicate one of the jacks 19 with the conduits 67 and 69 while isolating the other jacks from these sources of fluid pressure. Since the slope of the blade can be corrected equally by raising the left end of the blade or lowering the right end (or vice versa) once the desired blade slope is selected it is only necessary to automatically operate one of the jacks to provide corrections which will maintain the desired slope. FIG. 4 illustrates the invention conditioned to utilize the left jack 19 for correction purposes and conduits 69 and 73 are communicated while conduits 67 and 72 are communicated. FIG. 6 illustrates the invention with the right-hand jack 19 selected for correction purposes and accordingly conduits 67 and 74 are communicated and conduits 69 and 71 are communicated. It is to be noted that a neutral condition can also be selected by centering the valve spool 76 by means of manual selector 77 whereby neither of the jacks 19 communicate with conduits 69 and 67 and only manual corrections can be made to the slope of blade 24 by means of another source of hydraulic fluid pressure (not shown).

Referring specifically to FIG. 6, if during the operation of the motor grader terrain should be encountered which causes the orientation of the vehicle to be changed from the horizontal as indicated by line 78 to an orientation wherein the right side of the vehicle is higher than the left side as indicated by line 79, the following events would occur to reposition the blade 24 so as to maintain the desired slope of the blade. The valve 47 would immediately place an obstruction between the conduit 46 and a sump (in a manner to be described fully below) causing a rise in pressure in the conduit 52. A pressure rise in conduit 52 would increase the forces acting leftwardly on valve spool 41 over those acting rightwardly and cause the valve spool to shift from its center position to a leftwardly position. The leftward movement of spool 41 would immediately make available to conduit 67 the pressure fluid in conduit 37 whereby conduit 74 communicating with conduit 67 through selector valve 68 would become pressurized. Conduit 74 communicates with the head end of jacks 19 whereby the right side of blade 24 is moved downwardly in response to fluid pressure in conduit 74. Since the terrain encountered by the vehicle caused the right side of the vehicle to move upwardly, it is necessary to move the right side of the blade downwardly to re-obtain the desired blade orientation as the system so provided. If the left jack 19 had been selected for correction purposes rather than the right jack 19, the leftward movement of valve 41 would have resulted in fluid pressure being directed to conduit 73 which would have caused the left jack to retract and raise the left side of the blade 24. Once again, the proper compensation would have been achieved to re-orient the blade to the desired slope.

From the foregoing description it is seen that the present invention provides a hydraulic control system for an automatic blade control system wherein valve means 80 is associated with a hydraulic pressure system and wherein the valve means responds to a deviation of the pressure system from a pre-set condition to direct a source of hydraulic fluid pressure to one of the lift jacks associated with the controlled blade whereby the slope of the blade is automatically corrected when it deviates from a preselected slope.

Before describing in detail the two embodiments of the blade simulator controlled valve 47, a brief description of the ball resolver mechanism as illustrated in FIG. 3 will be given.

Referring to FIG. 3 a housing 81 is secured within ball 27 by a plate 82 which is rigidly secured to the ball 27 as by screws 83. A plurality of screws 84 are provided for vertical adjustment of the housing 81. Disposed within housing 81 is a universal joint or T bar 86 which includes a vertical member 87 and a horizontal cross member 88 which form a T bar, and a support member 89 which is secured to housing 81 and thus fixed relative to ball 27. Member 89 is supported by bearings 91 and 92 making angular rotation about a vertical axis possible. The T bar is hingedly secured to support member 89 such that the ball 27 is able to rotate in response to drawbar 26 being raised or lowered. Thus, the T bar has a rotational degree of freedom about a vertical axis by virtue of the bearing mountings of support member 89 and a further degree of freedom about a horizontal axis through the member 88 by virtue of the hinge connection between the T bar and the support member.

Connected to vertical member 87 is a quadrant 93 which extends forwardly out through the ball 27. The connection between quadrant 93 and vertical member 87 is sufficiently loose to enable the vertical member to rotate about its longitudinal axis without interference from the quadrant. The position of the quadrant member 93 is altered, however, whenever there is a change in the position of the vertical member 87 relative to a true vertical position. In this manner, changes in position of vertical member 87 are transformed into various degrees of rotation of shaft 94 which is integral with quadrant 93.

A pulley wheel 96 is secured to support member 89

Fluid is made available to port 137 from conduit 46 which connects with a passageway 138 in housing 103. Passageway 138 is aligned with a groove 139 which circumscribes the sleeve 134 and which is in communication with an axial channel 141 which communicates with the port 137. Fluid is made available through port 136 from conduit 52 which communicates with housing passage 142 which registers with annular groove 143 which circumscribes the outer surface of sleeve 134. Groove 143 communicates with axially aligned channel 144 which in turn communicates with port 136. Fluid which passes through the ports 136 and 137 flows to a central bore 146 in a shaft 147 to which the tubular section 131 is secured. The passageway 146 connects with a port 148 which leads to a low pressure sump (not shown). The ease of fluid flow through ports 136 and 137 is affected whenever the tubular section 131 is rotated in response to movement of pendulum 101, and also by either rotation or longitudinal movement of the sleeve 134.

The sleeve 134 is slidably disposed within a bore 149 formed in the housing 103. The longitudinal movement of the sleeve 134 is controlled by a rack 151 and interconnecting gear 152. The gear 152 is driven by a worm gear arrangement indicated generally at 153 which is similar to the worm gear drive described in conjunction with FIG. 2a. Like the embodiment of FIG. 2a the worm gear drive arrangement is manually operable by the vehicle operator from his operator's station. Thus, the operator is able to adjust the longitudinal position of the sleeve 134 and in so doing change the relative openings of the ports 136 and 137.

A spline connection formed by internal spline 154 on sleeve 134 and exterior spline 156 on the shaft 94 provides a connection whereby the sleeve 134 can be rotated by movement of the quadrant 93. The spline connection between the shaft 94 and sleeve 134 is sufficiently loose to enable longitudinal movement of sleeve 134 relative to shaft 94.

In operation, the vehicle operator moves the sleeve 134 longitudinally to the position which by previous calibration represents the slope at which he desires the blade 24 to operate. Unless the blade is already at the desired slope, the longitudinal movement of sleeve 134 will produce unequal pressures in conduits 46 and 52 which will result in working fluid being applied to one of the jacks 19 (see FIG. 4) for movement of one end of the blade. As the blade moves in response to operation of one of the jacks 19, the drawbar 26 is caused to rotate resulting in a repositioning of the blade slope simulator as evidenced by movement of quadrant 93 in the form of rotation of shaft 94. The rotation of shaft 94 causes the sleeve 134 to rotate thus altering the relative pressures in conduits 46 and 52 (these conduits reflect the changes which occur in the amount of the openings of ports 136 and 137 which are free to pass fluid). When the rotation of drawbar 26 induces rotation of sleeve 134 which results in equal pressures being re-established in conduits 46 and 52, the supply of working fluid to the operative jack 19 is discontinued and the drawbar discontinues its rotation. In this manner the initial blade slope setting is achieved.

With the desired blade slope achieved, operation is commenced. If during operation the vehicle encounters irregular terrain causing the slope of the blade 24 to deviate from the preselected slope, the pendulum 101 will change its position causing rotation of tubular section 131 with an attendant change in the pressures in conduits 46 and 52 so that the equilibrium condition will have been disturbed. Once again the system will respond to unequal pressures in conduits 46 and 52 by supplying working fluid to the operative lift jack 19 which will operate to change the position of one end of the blade until such time as equal pressures are re-established in the conduits 46 and 52.

Both the embodiment of FIGS. 2 and 2a and the embodiment of FIGS. 3 and 3a provide blade slope simulator controlled valve means responsive to actual changes in blade slope, as well as operator control settings, to provide working fluid to blade positioning apparatus wherein the blade positioning apparatus receives the fluid controlled by the blade slope simulator controlled valve until such time as the desired blade slope has been re-established at which time the blade slope simulator controlled valve discontinues the source of working fluid to the blade positioning apparatus.

Figure 5:
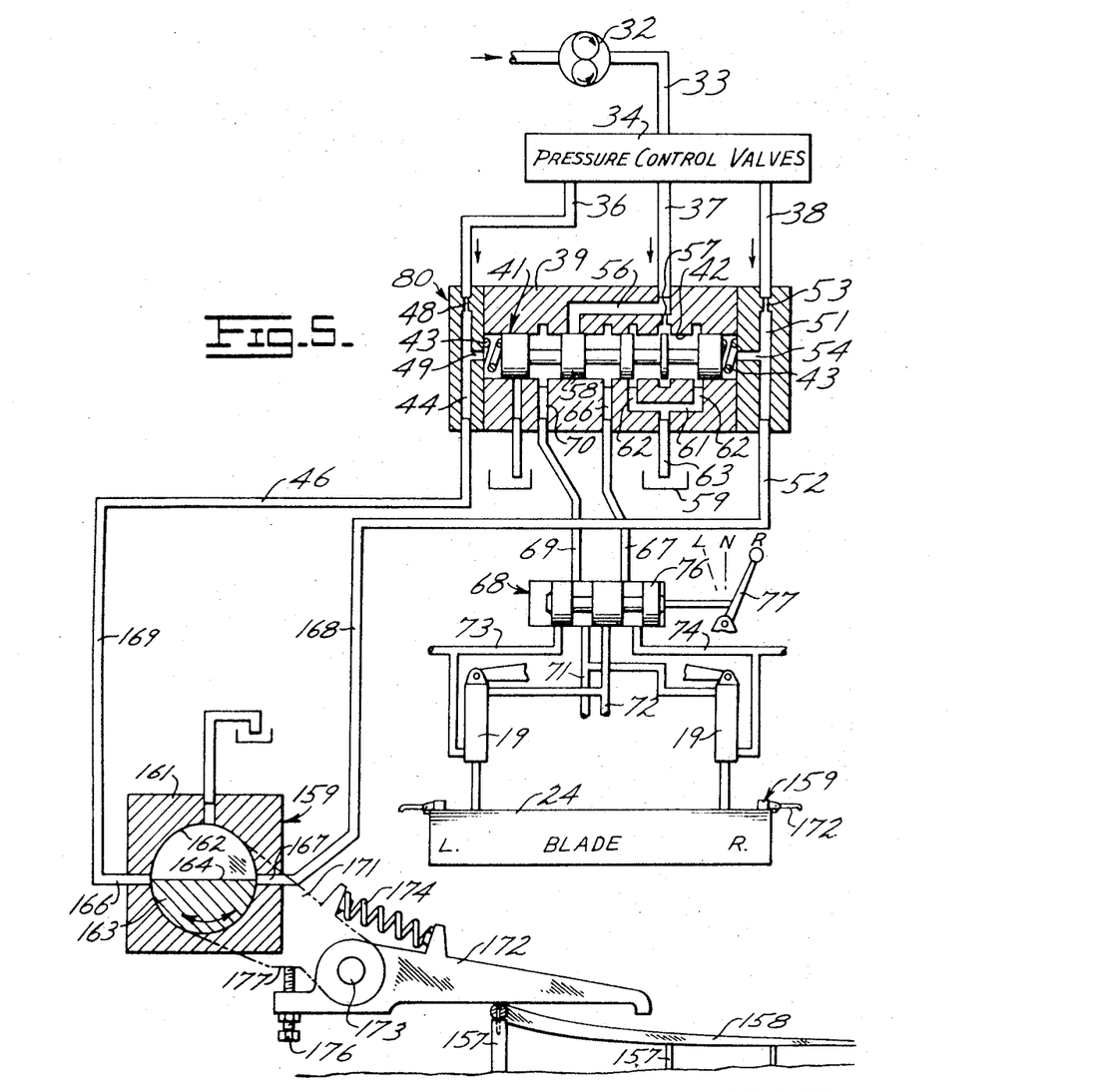
FIG. 5 is a semi-schematic illustration of the hydraulic control system employed with an alternate embodiment of the invention wherein the blade slope simulator is disposed on the blade itself.

A blade control system employing the hydraulic system described with reference to FIGS. 4 and 6, but employing a somewhat different blade simulator valve, is shown in FIG. 5 in conjunction with a series of grade stakes 157 which have a wire 158 secured along their tops. A flat shaft valve 159 includes a housing 161 having a central bore 162 which leads to a low pressure sump (not shown). Disposed within bore 162 is a shaft 163 of semi-circular cross section including a flat surface 164. When horizontally disposed the flat surface 164 intersects the openings of a pair of ports 166 and 167 which are diametrically disposed through the housing 161. Port 167 communicates with a conduit 168 while conduit 166 communicates with a conduit 169, wherein both conduits 168 and 169 communicate with a valve 171 which is substantially identical in all respects with valve 80 fully described in conjunction with FIG. 4. Thus, conduits 168 and 169 provide a constant flow of fluid which passes through ports 167 and 166, respectively, into bore 162. When the horizontal surface 164 intersects ports 166 and 167 equally, the pressure in conduits 168 and 169 is equal and neither of blade jacks 19 are supplied with actuating fluid for positioning blade 24.

The flat shaft 163 is connected to a lever 171 which in turn is pivotally connected to an arm 172 through a pin connection 173. A compression spring 174 is secured between lever 171 and arm 172 and operates to urge the arm 172 downwardly for engagement with the wire 158. An adjusting bolt 176 passes through the end of arm 172 and into engagement with a flat surface 177 on lever 171.

The housing 161, lever 171 and arm 172 are all mounted on the end of blade 24 (a complete unit can be mounted on each end of the blade to allow operation on both sides of one set of grading stakes). In operation the blade 24 is set at a desired slope and the arm 172 positioned to rest on the wire 158 such that the horizontal surface 164 of flat shaft 163 intersects the ports 166 and 167 equally as long as the blade is in its desired slope. As the vehicle traverses the terrain any deviations of the blade from the desired slope induce the lever 171 to rotate thus causing a difference to exist in the pressures in conduits 168 and 169 resulting in operating fluid pressure being delivered to one of the lift jacks 19 as previously described. The lift jack operates to reposition the blade until such time as the desired slope is re-established at which time the flat surface 164 will intersect the ports equally thereby re-establishing an equal pressure in the conduits 168 and 169. While the above described auxiliary system does not have the versatility of the system employing a blade slope simulator disposed in the drawbar ball, it does have the advantage of being somewhat less complex and less expensive. Thus, where a great deal of grading is done in connection with grade stakes which can advantageously be employed to assist in maintaining a desired slope, the above described system is highly advantageous.

In each of the embodiments of the invention described above, the hydraulic sensing valve which creates pressure imbalance in response to blade slope deviation from a preselected slope is isolated from and thus not affected by the high pressure source and blade lift jacks selectively communicated therewith. The advantage which accrues to such an arrangement of components is consistency of operation under all normal operating conditions. This, of course, is an essential feature if high accuracy work is to be performed by the automatically controlled working blade.

What is claimed is:

1. A valve for use in controlling the relative flow of fluid through two fluid carrying conduits, comprising in combination;

a generally cylindrical, hollow, valve sleeve having a pair of generally diametrically disposed ports therethrough said ports communicating with the fluid carrying conduits; and  a hollow tubular section rotatively disposed within said sleeve and having two opposing helical surfaces each of which intersects one of said ports;

said sleeve operatively mounted for longitudinal movement as well as axial rotation whereby the relative amount of fluid flow through said ports can be controlled.

References Cited

UNITED STATES PATENTS

| | | | |
|---|---|---|---|
| 1,313,105 | 8/1919 | Moran | 137—625.41 |
| 1,336,236 | 3/1920 | Johnson | 137—625.41 X |
| 3,211,182 | 10/1965 | Gyurik et al. | 137—625.63 X |
| 3,373,744 | 3/1968 | Kendall | 137—625.17 X |

M. CARY NELSON, Primary Examiner

MICHAEL O. STURM, Assistant Examiner

U.S. Cl. X.R.

137—625.41